United States Patent
Gjerde

[11] 3,787,169
[45] Jan. 22, 1974

[54] HIGH VELOCITY GAS IGNITER
[76] Inventor: Erwin G. Gjerde, 14095 Nona Ln., Whittier, Calif. 92802
[22] Filed: Oct. 20, 1972
[21] Appl. No.: 299,444

[52] U.S. Cl............... 431/347, 431/328, 431/354, 239/427, 239/432, 239/500, 239/504
[51] Int. Cl............................................ F23d 13/12
[58] Field of Search... 431/347, 350, 353, 354, 328; 239/427, 432, 504, 500

[56] References Cited
FOREIGN PATENTS OR APPLICATIONS
27,634   0/1902   Great Britain...................... 239/427

Primary Examiner—Carroll B. Dority, Jr.
Attorney, Agent, or Firm—Francis A. Utecht et al.

[57] ABSTRACT

A high velocity gas igniter for use in a high velocity flow stream and including a housing formed with axially aligned primary and secondary mixing chambers forming a flow stream. The primary mixing chamber has an upstream wall formed with a central gas inlet port surrounded by a plurality of primary air inlet ports. The partition dividing the primary and secondary chamber is formed with velocity reduction orifices having a relatively small composite cross-sectional flow area and the downstream end of such secondary chamber is in the form of an annular pressure drop ring forming a central outlet having a relatively large cross-sectional flow area. A vortex plate is disposed in confronting relationship with the velocity reduction ports for inducing mixing together of the air and gas, and a deflecting vane projects from the outlet to deflect the flow stream around such outlet port. Further, a flame retention ring is disposed in confronting relationship with and spaced from the outlet port to form a relatively protected flame retention zone. Thus, the gas port may be connected with a gas supply conduit and pressurized combustible gas applied thereto to initiate flow through the primary mixing chamber to draw ambient air through the air inlet port for initial mixing in the primary mixing chamber and flow through the pressure reduction orifices to impinge on the vortex plate to induce further mixing in the secondary mixing chamber. The relatively low pressure mixture flowing from the outlet port may be ignited to form an igniting flame and the entire igniter disposed in a high velocity flow stream.

9 Claims, 4 Drawing Figures

PATENTED JAN 22 1974　　3,787,169

HIGH VELOCITY GAS IGNITER

BACKGROUND OF THE INVENTION

1. Field of the Invention

The high velocity gas igniter of present invention relates to an igniter for use in high velocity flow streams such as exhausts from industrial furnaces.

2. Description of the Prior Art

Prior art gas igniters and torches are not generally acceptable for use in high velocity flow streams since the flames therefrom are blown out by the high velocity flow.

SUMMARY OF THE INVENTION

The high velocity gas igniter of the present invention is characterized by a housing formed with primary and secondary mixing chambers forming a flow path with the primary mixing chamber having its upstream wall formed with a gas inlet port surrounded by air inlet ports. The partition separating the secondary mixing chamber from the primary mixing chamber is formed with velocity reduction orifices which have a vortex plate disposed on the downstream side thereof. The downstream end of the secondary mixing chamber includes an annular ring forming an outlet port which has an axial deflector vane projecting therefrom for deflecting the flow stream around such outlet port. A flame retention ring is disposed in confronting relationship with but spaced from the outlet port to form a protective flame retention zone.

The objects and advantages of the present invention will become apparent from a consideration of the following detailed description taken in conjunction with the accompanying drawings.

DESCRIPTION OF THE PREFERRED EMBODIMENTS

Figure 1:
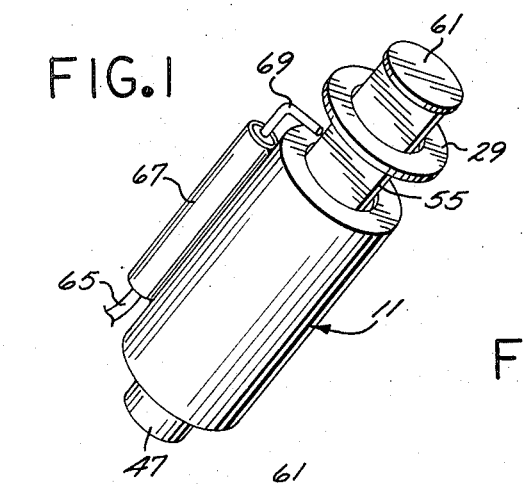
FIG. 1 is a perspective view of a high velocity gas igniter embodying the present invention.
Figure 3:
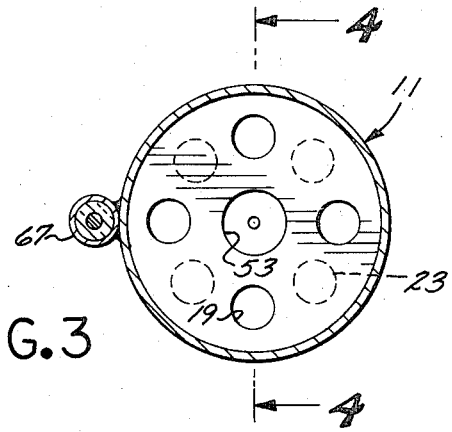
FIG. 3 is a transverse sectional view taken along the line 3—3 of FIG. 2.

The high velocity gas igniter of the present invention includes, generally, a cylindrical housing 11 formed with axially aligned primary and secondary mixing chambers 13 and 15 separated by an intermediate partition 17 formed with a plurality of velocity reduction orifices 19 which cooperate to form a relatively small composite cross-sectional flow area for restricting flow therethrough. The upstream end of the primary mixing chamber 15 is formed with an upstream wall having a central gas inlet port 21 formed therein and surrounded by a plurality of air inlet ports 23. The downstream end of the secondary mixing chamber 15 includes an annular ring 25 forming a central outlet port 27 having a relatively large cross-sectional flow area, such outlet port having a flame retention ring 29 disposed in confronting relationship therewith. A vortex plate 31 is disposed downstream of the velocity reduction orifices 19 to deflect and cause mixing of the gas and air within the secondary mixing chamber 15. Thus, gas may be introduced to the igniter through the gas inlet port 21 to draw ambient air into the air inlet ports 23 to initiate mixing of gas and air within the primary mixing chamber 13. The mixture formed in the primary mixing chamber 13 travels through the flow restriction ports 19 to strike the vortex plate 31 to be thoroughly mixed for being expelled at a relatively slow flow rate from the outlet port 27 for ignition thereof to maintain a flame in the area of the flame retention ring 29 so the entire igniter may be disposed in a high velocity gas flow stream to ignite such flow stream.

The cylindrical body 11 is in the form of a stainless steel tube approximately 1 inch in inside diameter and 2 inches long. The upstream end of such body 11 is covered with an annular ring 35 which cooperates with the upstream wall 36 to form a ½ inch long air plenum chamber. The wall 35 includes a central opening 37 and has a plurality of air inlet ports 39 formed therein. A connector tube 41 projects through the opening 37 to have its downstream end abutted with the upstream wall 43 of the primary mixing chamber 13. The upstream end of such connector tube 41 is internally threaded at 45 for connection with an externally threaded gas conduit 47.

Figure 2:
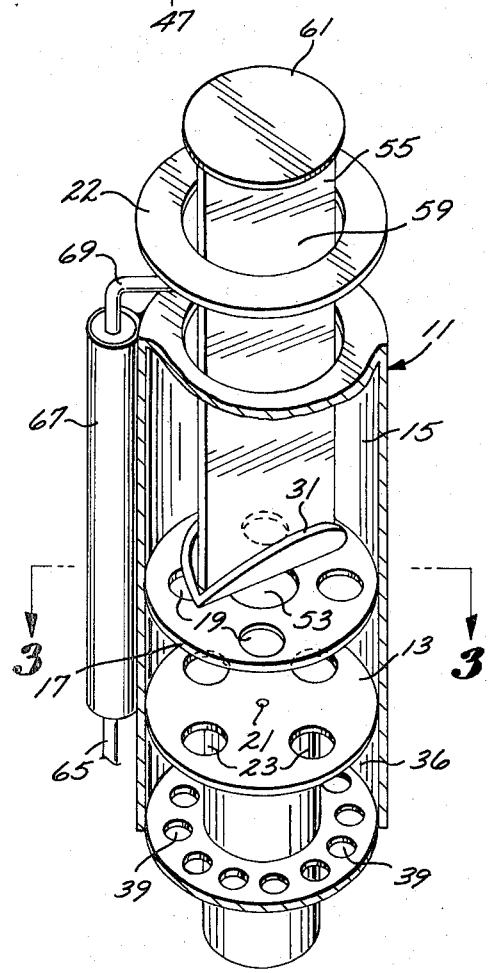
FIG. 2 is a perspective view, partially broken away and in enlarged scale, of the high velocity gas igniter shown in FIG. 1.

Referring to FIG. 2, the primary mixing chamber 13 is approximately ⅝ of an inch in length and has its downstream end formed by a flow restriction partition 51 which has the velocity reduction orifices 19 disposed thereabout in a circular pattern, a central velocity reduction orifice 53 being formed centrally in such partition.

The secondary mixing chamber 15 is approximately 1-¼ inches in length and has an axial flat deflector vane 55 telescoped thereinto and welded at its opposite edges to the back pressure ring 25. The vortex plate 31 is circularly shaped and is bent to form a V-shaped cross section with the apex thereof disposed centrally in confronting relationship with the central velocity reduction orifice 53. The vortex plate 31 is sufficiently smaller in diameter than the interior of the body 11 to cooperate therewith and to form an annular passage 57 for air and gas flow therepast.

Disposed loosely behind the vortex plate 31 is steel wool 58 which serves to force circuitous flow of gas and air flowing therethrough to assure through mixing thereof.

The back pressure ring and frame retention rings 25 and 29 are substantially the same size with the outlet port 27 being 0.60 inches in diameter and the flame retention ring 29 forming a central orifice 59 having a 0.60 inch diameter.

Welded to the end of the deflector vane 55 is a circular blocking plate 61 which cooperates with the flame retention ring 29 to form a relatively protected flame retention zone which is somewhat protected from the high velocity exterior flow stream.

Referring to FIGS. 1 and 2, an electrical starter 65 leads from an electrical source to a spark plug 67 mounted on the side of the housing 11. An electrode 69 projects from the spark plug 67 and turns inwardly over the back pressure ring 25 for igniting the mixture flowing from the outlet port 27.

Figure 4:
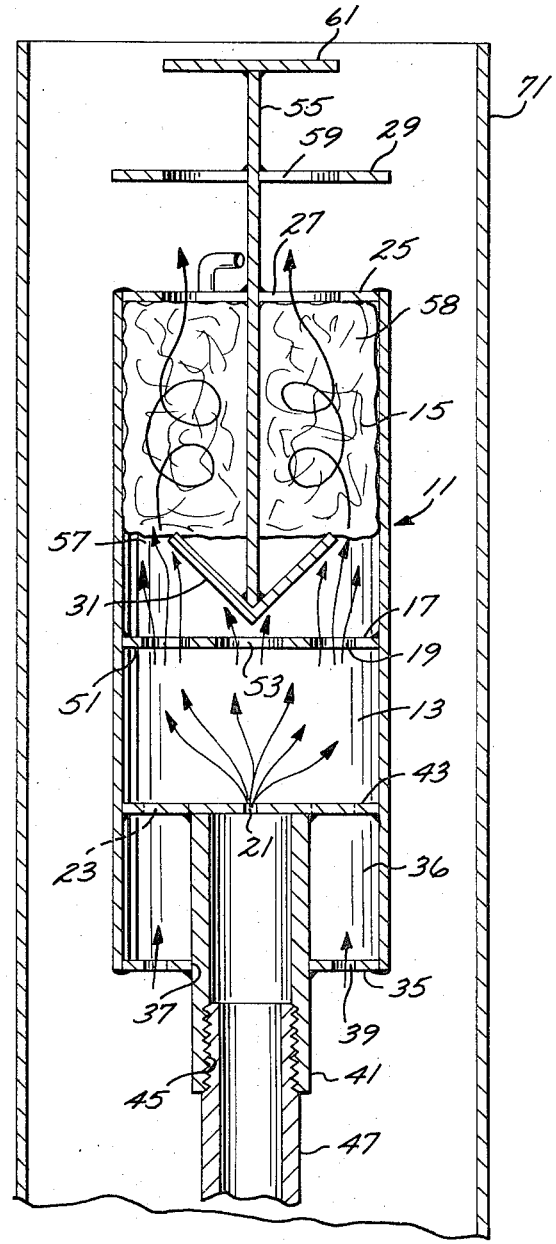
FIG. 4 is a transverse sectional view taken along the line 4—4 of FIG. 3.

The igniter shown in FIG. 4 is depicted housed in a protective pipe 71 but since such pipe is not critical to this invention, the operation of the subject igniter will first be described for installations without such pipe.

In operation, the high velocity gas igniter of the present invention may conveniently be utilized as a pilot light in a gas afterburner disposed in the exhaust duct of an industrial furnace. It will be appreciated that the flow stream in such exhaust duct is frequently in the order of several thousand feet per minute thus necessitating a pilot light which can withstand the resultant high velocities. The pilot light may be mounted in the afterburner with the gas conduit 47 being connected with the connector tube 41. The electrical cable 65 is connected with an electrical source and when it is desirable to fire the afterburner, the gas to the conduit 47 may be turned on to commence gas flow through the gas inlet port 21 to commence drawing ambient air inwardly through the inlet ports 23 thus creating a pressure drop in the plenum chamber 36 resulting in air being drawn thereinto from the inlet ports 39. The air and gas flowing through the primary mixing chamber 13 is mixed together and flows through the velocity reduction ports 19 and 53 to provide a reduced pressure in the secondary mixing chamber 15.

The flow streams from the velocity reduction ports 19 and 53 impinge directly on the vortex plate 31 thus deflecting such flow streams to the side of such vortex plate and through the annular flow area 57. The mixture moving downstream through the secondary mixing chamber 15 follows a rather circuitous path through the steel wool 38 to thus insure thorough and positive mixing thereof. It will be appreciated that the gas mixture flowing into the secondary mixing chamber 15 is split so half of the volumetric flow passes on opposite sides of the deflector vane 55 for expulsion from the outlet port 27. Since the outlet port 27 is of substantially greater cross-sectional flow area than the composite cross-sectional area of the flow restriction orifices 19 and 53, the gas mixture within the secondary mixing chamber 15 will be expanded and will flow at a relatively slow rate from the outlet port 27 thus creating a readily ignitable condition. Flow from the outlet port 27 partially passes through the opening 59 in the flame retention ring 29 and strikes the blocking plate 61 to be turned back on itself and form a plume of highly combustible gas.

The flame retention ring 29 and blocking plate 61 will also serve to interfere with flow of the flow stream therepast thus providing a somewhat quiet zone for ignition of the gases flowing from the outlet port 27. When the starter 67 is energized, the electrode 69 will ignite the gaseous mixture flowing from the outlet port 27 to initiate a flame in the area of the flame retention ring 29. Once the flame has been started, the starter 67 may be de-energized and the flame will continue burning to act as a pilot light for the afterburner which may be started therefrom.

It will be appreciated that the deflector vane 55 is disposed in the center of the pilot flame and will be heated red hot so in case the pilot flame is temporarily snuffed out, the heat in such vane will be sufficient to re-ignite the gaseous mixture flowing from the outlet port 27 without re-energizing the starter 67.

In other applications, such as in cement kilns where the flame reaches temperatures in the order of 2400°F to 3000°F, it is necessary to cool the subject igniter when it is to act as a pilot light and in such installations the igniter is installed within the open end of a protective pipe 71. The pipe 71 itself may be 6 to 12 feet long and cooling and combustion air is introduced to the end thereof opposite that in which the igniter is disposed. Consequently, the cooling air will flow around the igniter to maintain it cooled below the 2400°F of the surrounding environment thus protecting such igniter from melting.

From the foregoing, it will be appreciated that the igniter of the present invention provides a convenient and economical means for igniting an after-burner and maintaining such burner ignited.

I claim:

1. A high velocity gas igniter comprising:
    a housing formed with a primary mixing chamber having an upstream wall formed with gas inlet port means and primary air inlet port means;
    a secondary mixing and expansion chamber disposed downstream of said primary mixing chamber and having its upstream wall formed with a plurality of flow restriction ports forming a relatively small composite cross sectional flow area for restricting flow from said primary mixing chamber to said secondary mixing chamber, said secondary chamber being formed at its downstream end with a back pressure ring defining an outlet port having a relatively large cross-sectional area;
    a vortex plate disposed on the downstream side of said flow restriction ports,
    air deflector vane means projecting axially from said outlet port; and
    flame retention ring means disposed in confronting relationship with said outlet port and spaced therefrom whereby a gas conduit may be connected with said inlet and pressurized combustible gas supplied thereto to initiate flow through said primary mixing chamber to draw ambient air through said air inlet port means for mixing with said gas to form an air-gas mixture to flow through said flow restriction ports to strike said vortex plate means to provide a relatively low velocity and low pressure mixture in said secondary mixing and expansion chamber for flow at a slow rate from said outlet port thus enabling the expelled mixture to be ignited and when a high velocity flow stream flows past said igniter, said deflector vane means will serve to deflect such stream past said outlet port to prevent entry into said secondary mixing chamber.

2. A high velocity gas igniter as set forth in claim 1 that includes:
    a plenum chamber formed upstream of said air inlet port means and including air introduction ports for introducing air into said plenum chamber.

3. A high velocity gas igniter as set forth in claim 1 wherein:
    said flame retention ring means includes a ring formed with a central opening centered in front of said outlet port.

4. A high velocity gas igniter as set forth in claim 1 wherein:
    said deflector vane includes a plate projecting centrally from said outlet port and having said ring means mounted thereon.

5. A high velocity gas igniter as set forth in claim 1 that includes:
    a blocking plate disposed in front of said outlet port and spaced therefrom.

6. A high velocity gas igniter as set forth in claim 1 that includes:

a starter mounted on one side of said housing and including electric circuit means for energization thereof.

7. A high velocity gas igniter as set forth in claim 1 that includes:

steel wool means in said secondary mixing chamber to form a circuitous path for said mixture.

8. A high velocity gas igniter as set forth in claim 1 wherein:

said deflector vane means includes a plate projecting centrally into said secondary mixing chamber and fastened on its opposite sides to said flame retention ring means and said igniter includes a vortex plate carried from said plate and disposed in front of said flow restriction ports.

9. A high velocity gas igniter as set forth in claim 1 for use as a pilot light and including:

pipe means having said housing received in and disposed proximate one end thereof and of sufficient cross sectional area to form a path therearound for travel of cooling air.

* * * * *